United States Patent
Sargent et al.

(10) Patent No.: US 7,523,101 B2
(45) Date of Patent: Apr. 21, 2009

(54) METHOD AND SYSTEM FOR ANNOTATING CONFIGURATION FILES

(75) Inventors: Robert Sargent, Knoxville, TN (US);
Richard Livingston, Miami, FL (US);
Santos Haro, San Jose, CA (US);
Dennis Caughran, Anacortes, WA (US)

(73) Assignee: Cisco Technology, Inc., San Jose, CA (US)

( * ) Notice: Subject to any disclaimer, the term of this patent is extended or adjusted under 35 U.S.C. 154(b) by 476 days.

(21) Appl. No.: 11/132,050

(22) Filed: May 17, 2005

(65) Prior Publication Data

US 2006/0262801 A1 Nov. 23, 2006

(51) Int. Cl.
*G06F 17/30* (2006.01)
(52) U.S. Cl. .................. 707/3; 707/1; 707/6; 707/7; 707/10; 707/104.1
(58) Field of Classification Search .............. 707/1, 707/3, 6, 7, 10, 104.1; 709/220, 223–229; 710/8, 10; 702/122, 186, 188
See application file for complete search history.

(56) References Cited

U.S. PATENT DOCUMENTS

| | | | |
|---|---|---|---|
| 6,598,057 B1 | 7/2003 | Synnestvedt et al. | |
| 6,691,138 B1* | 2/2004 | Kirkpatrick et al. | 707/204 |
| 6,760,755 B1* | 7/2004 | Brackett | 709/214 |
| 2004/0088142 A1* | 5/2004 | Ashley et al. | 702/184 |
| 2005/0086589 A1* | 4/2005 | Hunt | 715/505 |
| 2005/0125396 A1* | 6/2005 | Liu | 707/3 |

\* cited by examiner

*Primary Examiner*—Cam-Linh Nguyen
(74) *Attorney, Agent, or Firm*—Trellis IP Law Group, PC

(57) ABSTRACT

A method, a system, a computer readable medium, and an apparatus for providing information related to a configuration file to a user are provided. The user provides the configuration file to the system of the invention. The system conducts a search for the information related to the configuration file. The information is sought in at least one source, and the information that is found in the source is provided back to the user.

21 Claims, 2 Drawing Sheets

METHOD AND SYSTEM FOR ANNOTATING CONFIGURATION FILES

BACKGROUND OF THE INVENTION

1. Field of Invention

Embodiments of the invention relate in general to networking. More specifically, the embodiments of the invention relate to methods and systems for providing information related to network configurations.

2. Description of the Background Art

The field of networking has grown in size and complexity over the last few years. The ubiquitous use of computers has led to the development of different types of networks connecting these computers. Connection between different networks is enabled through routers.

Routers serve as traffic managers directing communications traffic between the different networks. A router is configured through a configuration file containing statements for directing the router's operation. A network administrator scripts the configuration file by framing a basic policy for the router's operation, and converting this policy into individual statements in the configuration file. These statements enable the router to direct the communications traffic, based on the policy framed by the network administrator.

The statements required for configuring a router need to be scripted in a specific format, which varies with different types of routers. This makes it difficult for the network administrator to script the configuration file. Further, the growing complexity of networks has resulted in increasing the complexity of the statements required to configure the routers. Hence, the network administrator frequently requires help and specific information about the router while scripting the configuration file.

Currently, the network administrator needs to browse through voluminous and sometimes confusing books and manuals for information related to the configuration. Alternatively, the information is available only through a time-consuming search on the Internet or on other sources. Further, the information may be incomplete or irrelevant for the requirements.

The same difficulty is faced by a user who has to script a configuration file for other purposes, such as for configuring a communication switch, a shared printer or a computer server.

SUMMARY

A method is provided for receiving a help request from a user. The help request includes at least a portion of a configuration file usable to configure operation of a network device. The configuration file include statements for directing the operation of the network device. One or more sources are searched to determine configuration information related to the statements where the determined configuration information includes reference information for directing the operation of the network device. The determined configuration information is then provided to the user.

DETAILED DESCRIPTION OF EMBODIMENTS OF THE INVENTION

Embodiments of the invention provide a method, a system, a computer-readable medium, and an apparatus for providing information related to a configuration file to a user. The configuration file is provided by the user as an input to the system. The system conducts a search for the information related to the configuration file in at least one source. The information found in the source is provided to the user.

In various embodiments of the invention, the configuration file can configure a computer network. In an embodiment, the configuration file can contain statements that direct operations of network devices. In this case, the user can be a network administrator who scripts the configuration file. In various embodiments, the network device can be a router that directs network traffic, based on the statements in the configuration file. In various other embodiments, the configuration file can configure a communication switch.

In various embodiments of the invention, the configuration file can configure a shared printer or any other network device. In other embodiments, the configuration file can configure a client-server arrangement of computers.

In various embodiments of the invention, user 104 can send excerpts or individual statements from the configuration file to system 102. In this case, information is provided corresponding to the excerpts or statements received from user 104.

Figure 1:
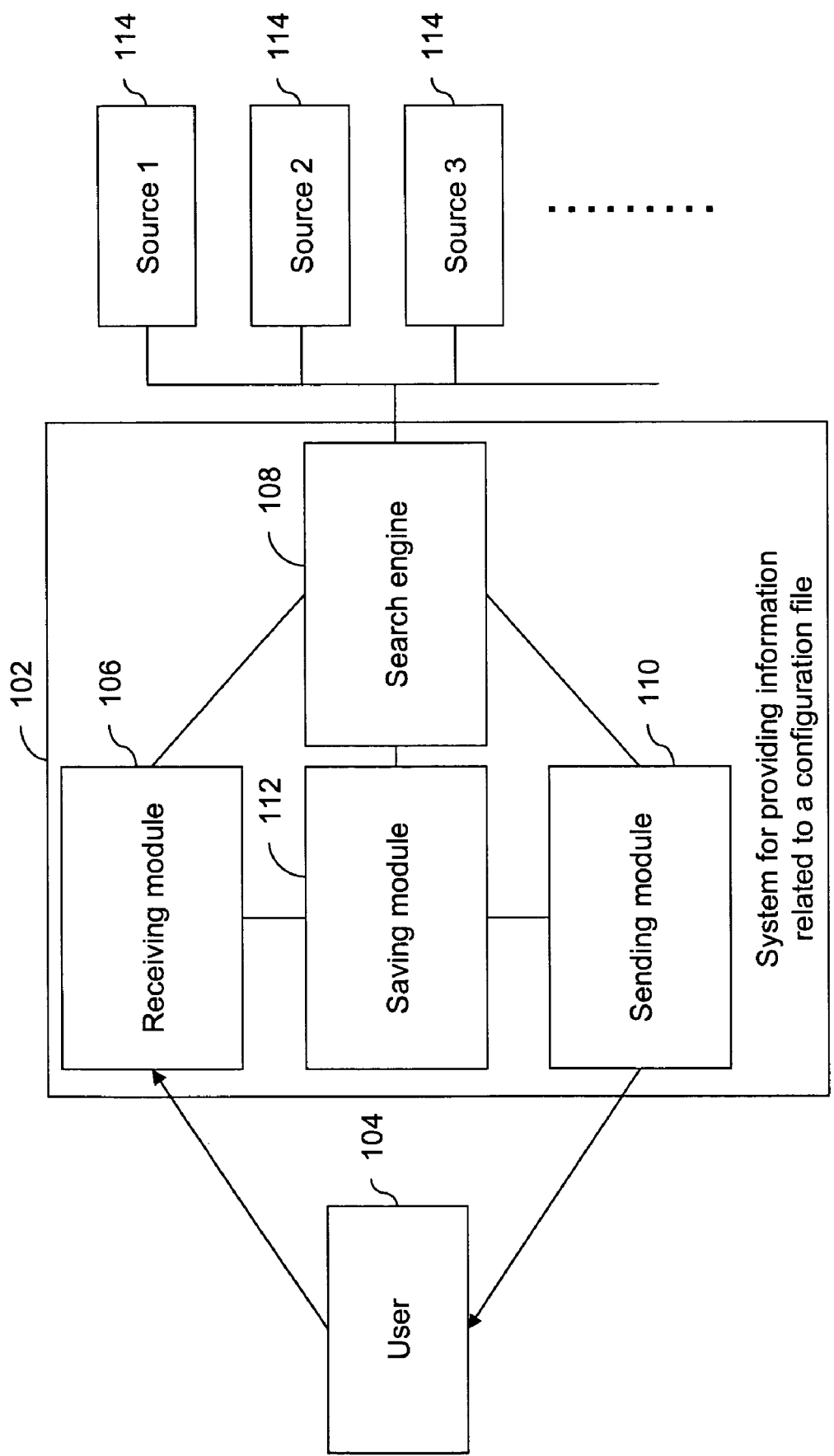
FIG. 1 illustrates a system environment for providing information related to a configuration file, according to an exemplary embodiment of the invention.

FIG. 1 illustrates a system environment for providing information related to a configuration file, according to an exemplary embodiment of the invention. A system 102 provides information related to a configuration file that is sent by a user 104. System 102 includes a receiving module 106, a search engine 108, a sending module 110, and a saving module 112. In various embodiments of the invention, each of the modules of system 102 can be implemented as software, firmware or a combination thereof. Receiving module 106 receives the configuration file sent by user 104. Search engine 108 searches for information related to the configuration file in one or more sources 114. Sending module 110 then sends the information found in sources 114 to the user. Saving module 112 saves the configuration file received from user 104.

In various embodiments of the invention, receiving module 106 can be a web page, which provides an interface for receiving the configuration file from user 104. User 104 can type the configuration file on the web page interface. Alternatively, user 104 can paste the contents of the configuration file on the interface. In various embodiments, system 102 receives the configuration file only after confirmation for doing so is provided by user 104.

In other embodiments of the invention, receiving module 106 can be an email server. In this case, user 104 can send the configuration file by an email. This file is received by system 102. Alternatively, in an embodiment, receiving module 106 can be a file transfer protocol (FTP) server. In this case, the configuration file can be received from user 104 through FTP.

Search engine 108 searches for the information related to the received configuration file. The information sought assists user 104 to script the configuration file. For example, in various embodiments, the information can provide syntax for individual statements in the configuration file, different configuration set-ups possible, and/or appropriate configuration solutions related to the configuration file. In various embodiments, search engine 108 can search for information using a keyword based search. The keywords can be derived from the statements in the configuration file.

In various embodiments of the invention, search engine 108 can search for information related to individual statements in the configuration file. Search engine 108 can perform a separate search for information related to each statement in the configuration file. In this case, distinct information can be provided, corresponding to each individual statement in the configuration file.

The search is performed in one or more sources 114. The depiction of only three sources in FIG. 1 is only for illustration purposes. Search engine 108 can also search for information related to the configuration file in less than three sources or in more than three sources.

In various embodiments of the invention, search engine 108 searches on the Internet for information related to the configuration file. In this case, sources 114 are located on the Internet and search engine 108 can perform a search on them. In an embodiment, sources 114 can be web pages containing information related to the configuration file. In various embodiments, sources 114 can be documents containing information related to the configuration file. For example, in various embodiments, search engine 108 can search for information in Microsoft Word or Adobe Acrobat documents.

In other embodiments of the invention, search engine 108 searches for information in sources 114 located in private domains such as company intranets or virtual private networks. In various embodiments of the invention, search engine 108 can search for information in sources 114 located on the Internet as well as in private domains.

Furthermore, according to various embodiments of the invention, search engine 108 can search for information in proprietary sources. In this case, an individual, a company or a group can have exclusive rights over sources 114. Search engine 108 then searches for information in proprietary sources 114, for which permission has been obtained from the respective rights holders. In an embodiment where the configuration file configures a router, sources 114 can contain information provided by the company that has manufactured the router.

In other embodiments of the invention, sources 114 can be non-proprietary and available in the public domain without any restrictions. In various embodiments of the invention, search engine 108 can search for information in both proprietary and non-proprietary sources.

In various embodiments of the invention, search engine 108 can search for information where sources 114 are reference manuals containing information related to the configuration file. For example, in an embodiment where the configuration file configures a router, sources 114 can be reference manuals containing specific information about the router. In various embodiments, sources 114 can be configuration guides containing information about scripting the configuration file. In various embodiments of the invention, sources 114 can include both reference manuals and configuration guides.

The information found by search engine 108 is provided to user 104 by sending module 110. In various embodiments of the invention, sending module 110 can be a web page. The web page can provide an interface for user 104 to view the information related to the configuration file. Alternatively, in various embodiments, the information can be provided to user 104 by email. In other embodiments, the information can be provided to user 104 by FTP transfer.

In various embodiments of the invention, the information provided to user 104 can be in the form of a Universal Resource Locator (URL). The URL can point to an Internet web page that contains information related to the configuration file. Alternatively, the URL can also point to documents related to the configuration file. In embodiments of the invention, information can be provided by inserting the appropriate URLs in the configuration file and sending the configuration file back to user 104.

In other embodiments of the invention, the information can include text and images related to the configuration file. In various embodiments of the invention, documents containing the related information can be provided to user 104.

Various embodiments of the invention can further include saving module 112, which saves the configuration file received from the user. In some embodiments, saving module 112 can save the configuration file immediately after it is received from the user. In various embodiments, saving module 112 can enable a cache of real-world configuration files to be saved along with the related information provided to the user. The configuration file can be saved in any format known to a person skilled in the art. For example, in various embodiments, the configuration file can be saved as a text file, in hypertext markup language (HTML), or in any other format.

Figure 2:
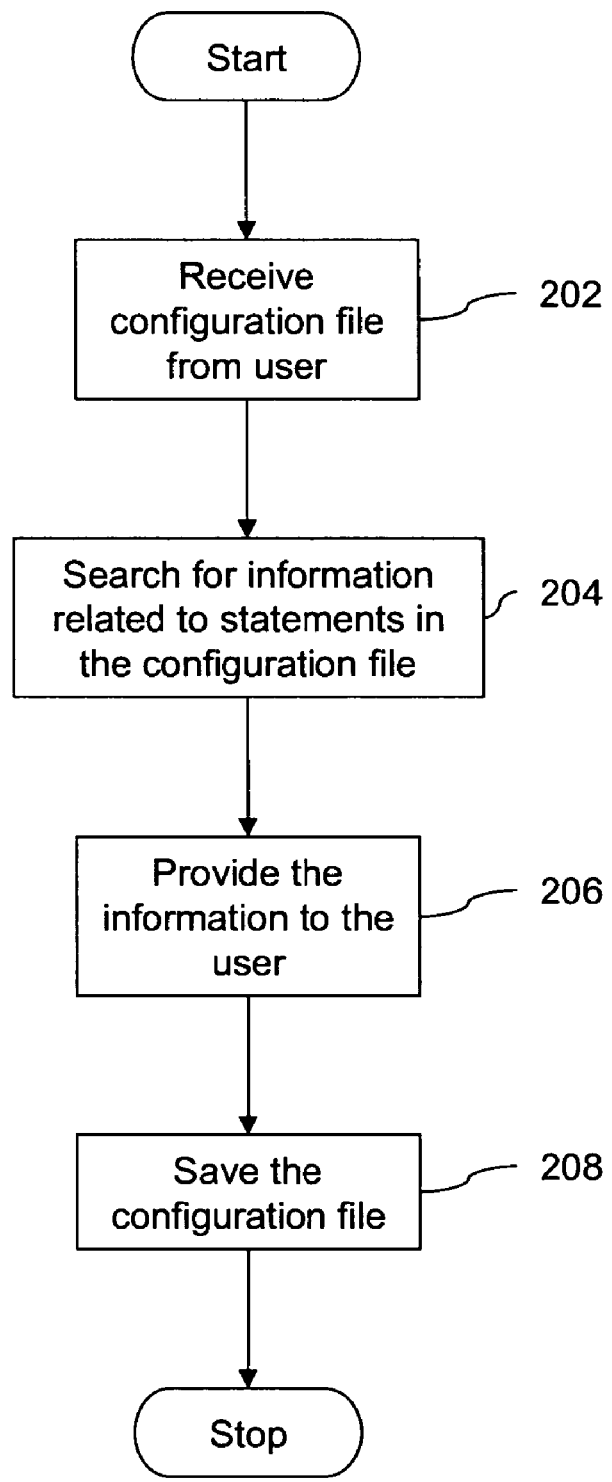
FIG. 2 illustrates a method for providing information related to a configuration file to a user, according to various embodiments of the invention.

FIG. 2 illustrates a method for providing information related to a configuration file to user 104, according to various embodiments of the invention. At step 202, the configuration file is received from user 104 by receiving module 106. At step 204, a search is conducted for information related to the configuration file by search engine 108. According to an embodiment, the search can be conducted for individual statements in the configuration file. At step 206, the information found during the search is provided to user 104 by sending module 110. At step 208, saving module 112 saves the received configuration file.

A method, according to an exemplary embodiment of the invention, is hereinafter described in detail. In this case, the configuration file configures a router. The router can be a Cisco router. The configuration file is received from user 104 through a web interface. Receiving module 106, in this case, can be a web page on the Internet. The web interface enables user 104 to enter the configuration file for which the information is required.

A configuration file sent by user 104, in accordance with an embodiment of the invention, can be as follows:

```
version 12.2
service timestamps debug datetime msec localtime
service timestamps log datetime msec localtime
service password-encryption
service internal
!
hostname sgtisdn
```

In the embodiment, search engine 108 can perform a search for information related to individual statements in the configuration file. In this case, distinct information can be provided for each statement in the configuration file. Search engine 108 performs a search for related information on the Internet. The search is performed in proprietary sources provided by Cisco. Related information is sought in reference manuals and configuration guides available online on the Internet.

The information is provided to user 104 through a web interface. In this case, sending module 110 is the web interface. URLs pointing to related reference manual entries and configuration guide entries are inserted after each individual statement in the configuration file. The annotated version of the configuration file containing the URLs is then provided on the web page.

An annotated version provided to user 104, in accordance with the embodiment of the invention, can be as follows:

```
version 12.2   <RefManURL>       <ConfigGuideURL>
service timestamps debug datetime msec localtime   <RefManURL>
    <ConfigGuideURL>
service timestamps log datetime msec localtime     <RefManURL>
    <ConfigGuideURL>
service password-encryption <RefManURL>       <ConfigGuideURL>
service internal            <RefManURL> <ConfigGuideURL>
!
hostname sgtisdn            <RefManURL> <ConfigGuideURL>
```

The configuration guide received from user 104 can be saved by system 102. The configuration file can be saved immediately after it is received from user 104. The annotated version of the configuration file can also be saved.

To summarize, the embodiments of the invention provide a user with comprehensive information related to a configuration file. The user does not need to perform a time-consuming manual search through various sources for information related to the configuration file, and can obtain specific information related to it more easily. In various embodiments of the invention, syntax for individual statements in the configuration file can be provided. In various embodiments, different configuration set-ups and optimal configuration solutions related to the configuration file can be provided. Embodiments of the invention further enable a cache of real-world configuration files to be saved. This cache can be used to provide device-specific configuration files to the user, based on the configuration information provided by the user. This cache can also be useful for further research and development. For example, in the case of configuration files for routers, this cache can enable further development of routers that service the requirements of network administrators more efficiently.

Although the invention has been discussed with respect to specific embodiments thereof, these embodiments are merely illustrative, and not restrictive, of the invention. For example, the configuration file can be received from a user through any means, including but not limited to email, FTP and web interface.

Although specific protocols and methods of communication such as the Internet and web page have been used to describe embodiments, other embodiments can use other transmission protocols or standards. The use of the terms 'peer', 'client' and 'server' can include any type of device, operation or other process. The present invention can operate between any two processes or entities, including users, devices, functional systems, or combinations of hardware and software. Peer-to-peer networks and any other networks or systems, where the roles of client and server are switched, change dynamically or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store the computer program for use by or in connection with the instruction execution system apparatus, system or device. The computer readable medium can be, by way of example only but not by limitation, semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method comprising:
   receiving a help request from a user, the help request including at least a portion of a configuration file used to configure operation of a network device, the configuration file including statements for directing the operation of the network device;
   searching one or more reference or configuration sources of reference manuals or configuration guides to determine configuration information entries related to the statements, the determined configuration information entries being a section in the reference or configuration sources that includes reference information for directing the operation of the network device, the reference manual providing information about the network device and the configuration guide providing configuration information about the configuration file;
   generating one or more links to the configuration information for the statements, the links pointing to the configuration information entries of the reference or configuration sources that include the reference information for the statements, wherein links determined for a statement point to a entry in the reference or configuration sources that is determined to be related to the statement; and
   providing a document to the user, the document including the statements and the one or more links, wherein the one or more links are associated with statements on the document to allow a user to select a link to retrieve the section in the reference or configuration sources that is related to the statement.

2. The method of claim 1, wherein the at least a portion of the configuration file is used by the network device in directing traffic through the network device.

3. The method of claim 1, wherein the statements in the at least a portion of the configuration file are the statements used in the configuration file for the network device to direct traffic.

4. The method of claim 1, wherein the determined configuration information comprises syntax for that the statements.

5. The method of claim 1, wherein the determined configuration information comprises different configuration set-ups based on the statements.

6. The method of claim 1, wherein the determined configuration information comprises a configuration solution for the statements.

7. The method of claim 1, wherein providing comprises providing one or more links to a reference manual including the determined configuration information.

8. The method of claim 1, wherein providing comprises providing one or more uniform resource locators usable to access the determined configuration information.

9. The method of claim 1, wherein the statements allow the network device to operate based on a policy framed by the user.

10. The method of claim 1, wherein receiving comprises receiving the at least a portion of the configuration file through a web-based interface.

11. A computer-readable medium storing logic encoded in the computer-readable media for execution by the one or more processors, the logic when executed performing:
    receiving a help request from a user, the help request including at least a portion of a configuration file used to configure operation of a network device, the configuration file including statements for directing the operation of the network device;
    searching one or more reference or configuration sources of reference manuals or configuration guides to determine configuration information entries related to the statements, the determined configuration information entries being a section in the reference or configuration sources that includes reference information for directing the operation of the network device, the reference manual providing information about the network device and the configuration guide providing configuration information about the configuration file;
    generating one or more links to the configuration information for the statements, the links pointing to the configuration information entries of the reference or configuration sources that include the reference information for the statements, wherein links determined for a statement point to a entry in the reference or configuration sources that is determined to be related to the statement; and providing a document to the user, the document including the statements and the one or more links, wherein the one or more links are associated with statements on the document to allow a user to select a link to retrieve the section in the reference or configuration sources that is related to the statement.

12. The computer-readable medium of claim 11, wherein the at least a portion of the configuration file is used by the network device in directing traffic through the network device.

13. The computer-readable medium of claim 12, wherein the statements in the at least a portion of the configuration file are the statements used in the configuration file for the network device to direct traffic.

14. The computer-readable medium of claim 11, wherein the determined configuration information comprises syntax for that the statements.

15. The computer-readable medium of claim 11, wherein the determined configuration information comprises different configuration set-ups based on the statements.

16. The computer-readable medium of claim 11, wherein the determined configuration information comprises a configuration solution for the statements.

17. The computer-readable medium of claim 11, wherein logic performing the providing comprises logic performing providing one or more links to a reference manual including the determined configuration information.

18. The computer-readable medium of claim 11, wherein logic performing providing comprises logic performing providing one or more uniform resource locators usable to access the determined configuration information.

19. The computer-readable medium of claim 11, wherein the statements allow the network device to operate based on a policy framed by the user.

20. The computer-readable medium of claim 11, wherein the logic performing receiving comprises logic performing receiving the at least a portion of the configuration file through a web-based interface.

21. An apparatus comprising means for receiving receiving a help request from a user, the help request including at least a portion of a configuration file used to configure operation of a network device, the configuration file including statements for directing the operation of the network device;

means for searching one or more reference or configuration sources of reference manuals or configuration guides to determine configuration information entries related to the statements, the determined configuration information entries being a section in the reference or configuration sources that includes reference information for directing the operation of the network device, the reference manual providing information about the network device and the configuration guide providing configuration information about the configuration file;

means for generating one or more links to the configuration information for the statements, the links pointing to the configuration information entries of the reference or configuration sources that include the reference information for the statements, wherein links determined for a statement point to a entry in the reference or configuration sources that is determined to be related to the statement; and means for providing a document to the user, the document including the statements and the one or more links, wherein the one or more links are associated with statements on the document to allow a user to select a link to retrieve the section in the reference or configuration sources that is related to the statement a help request from a user, the help request including at least a portion of a configuration file usable to configure operation of a network device, the configuration file including statements for directing the operation of the network device.

* * * * *

UNITED STATES PATENT AND TRADEMARK OFFICE
CERTIFICATE OF CORRECTION

| | |
|---|---|
| PATENT NO. | : 7,523,101 B2 |
| APPLICATION NO. | : 11/132050 |
| DATED | : April 21, 2009 |
| INVENTOR(S) | : Robert Sargent |

It is certified that error appears in the above-identified patent and that said Letters Patent is hereby corrected as shown below:

Col. 10, lines 34-38, delete "a help request from a user, the help request including at least a portion of a configuration file usable to configure operation of a network device, the configuration file including statements for directing the operation of the network device;"

Signed and Sealed this

Twenty-third Day of June, 2009

JOHN DOLL
*Acting Director of the United States Patent and Trademark Office*